ELKINS & GREEN.
Automatic Gate.
No. 55,633.
Patented June 19, 1866.
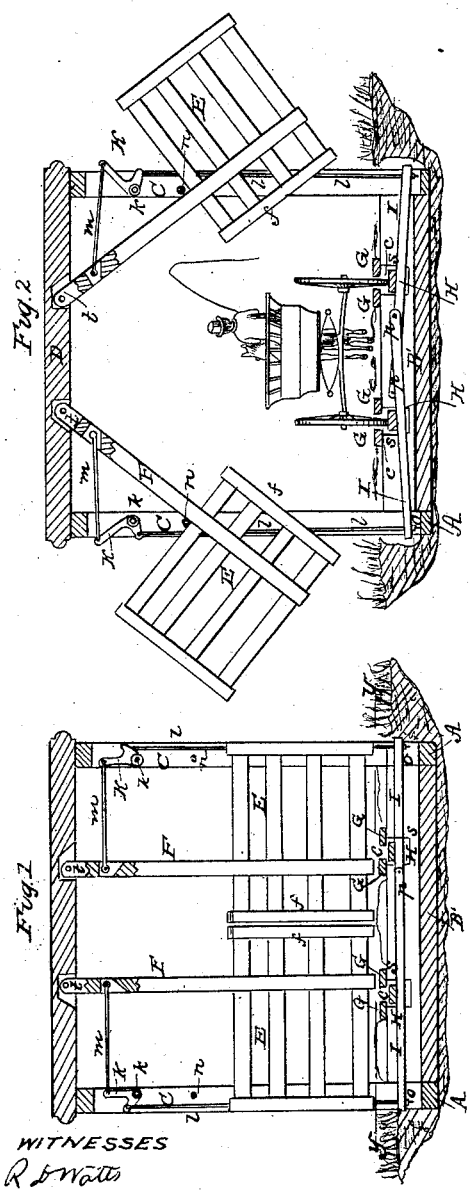
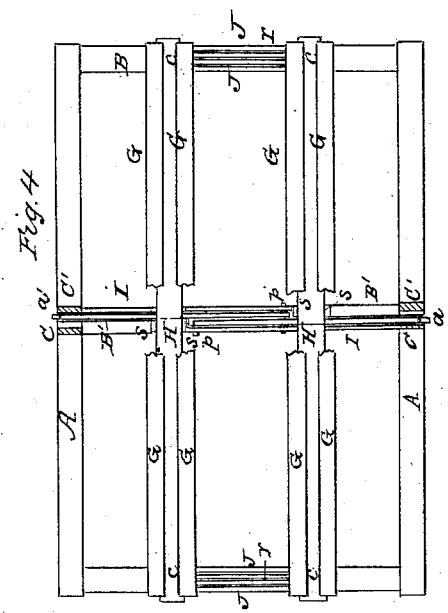
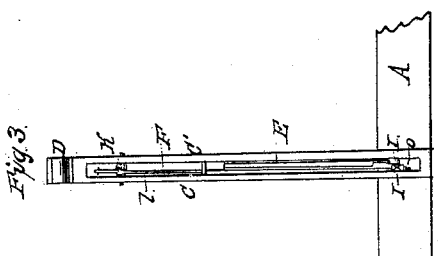
WITNESSES
R D Watts
Henry Royman
INVENTORS
J S Elkins
J T Gray

UNITED STATES PATENT OFFICE.

J. S. ELKINS AND J. T. GREEN, OF MARQUETTE, WISCONSIN.

IMPROVEMENT IN AUTOMATIC GATES.

Specification forming part of Letters Patent No. 55,633, dated June 19, 1866.

*To all whom it may concern:*

Be it known that we, JOSEPH S. ELKINS and JESSE T. GREEN, of Marquette, in the county of Green Lake and State of Wisconsin, have invented a new and improved mode of constructing gates to render the opening and closing of the same automatic; and we do hereby declare that the following is a full and exact description thereof, reference being had to the accompanying drawings, and to the letters of reference marked thereon, in which—

Figure 1 is a vertical cross-section, taken in the line $a'$ $a'$ of Fig. 4, showing the gate in a closed position. Fig. 2 is a vertical cross-section, taken in the same plane as Fig. 1, showing the gate in an open position. Fig. 3 is a side elevation of the main portion of the gate; and Fig. 4 is a ground-plan view, partly in section, on the line $y$ $y$ of Fig. 1.

The nature of our invention consists in providing a truck upon which the pressure of the wheels of a vehicle in passing over it forces open the gate by means of levers, rods, and elbows arranged and combined as herein described and shown.

To enable others skilled in the art to make and use our invention, we will proceed to describe its construction and operation.

A A are two heavy sills placed in the ground, with their upper surfaces level with the top of the ground. These sills extend a sufficient distance both sides of the gate to allow the horses and vehicle to be at full length upon it while the gate is still closed.

B B' B are three cross-timbers framed into the sills A A in the position shown in Fig. 4. These cross-timbers are properly hollowed out to receive the levers I I and J J, as will be hereinafter more fully explained.

C C are the main posts or uprights of the gate, with a long mortise or slot large enough for the gate to pass through, and extending from the bottom to or near to the top; or these posts may be made of two separate heavy planks, C and C', bolted together, with blocking properly arranged to keep them at the requisite distance apart to allow the passage of the gates and the action of the elbows, rods, &c., between them. These posts C C are united at the top by the cross-beam D, which also serves to support the gates E E, which are suspended from it by the bars F F in such a manner as to swing or oscillate freely upon the centers $t$ $t$. These bars F F are connected with the gate at a point nearer to their inner stiles $f$ $f$, in order that the center of gravity, being outside of the point of suspension $t$, the gates may be firmly held together by the force of gravitation alone, when this force is not overcome by the greater gravity of a vehicle passing through the gate, as will be hereinafter described.

To the surface of the cross-timbers B B' B are secured four long scantlings, G G G G, arranged in pairs in such a position that the openings $c$ $c$ between each pair may be wide enough to allow the wheels of ordinary vehicles to pass down between them and rest upon the timbers H H, immediately beneath the openings $c$ $c$, as seen in Fig. 4. These timbers H H are not stationary, like the strips G G, but are let down into notches S S, provided in the cross-timbers B, and are attached at their middles to the levers I I, pivoted by bolts $p$ $p$ within the thickness of the cross-piece B', and at each end to the links or swinging arms J J, acting in concert with the levers I I, but only serving to steady the timbers H H and render their action prompt and uniform when the pressure is applied at their extreme ends as well as at their middle, which is directly over the gate-levers I I. These levers I I are pivoted at one end to the timber B' at $p$ $p$, and at the other end connected by the screw-nuts $o$ $o$ to the vertical rods $l$ $l$, which rods connect the levers I I with the elbow-levers or bell-crank levers K K, pivoted at $k$ $k$ to the posts C C'. These elbow-levers again connect at their upper arms, by the links or rods $m$ $m$, with the gate-swinging bars F F, before described.

The operation of the gate is as follows: It being closed, as in Fig. 1, the vehicle is driven onto the truck or frame with the wheels between the guide-pieces G G and resting upon the timbers H H, as indicated in red outline in Fig. 2. The weight of the vehicle forces down the said timbers, and they in turn force down the levers I I, thus drawing down the rods $l$ $l$ and actuating the bell-crank levers K K, which, in turn, draw outwardly the links $m$ $m$, which, being attached to the bars F F, cause them to swing outwardly, drawing the gates E E with them, until they bring up against the stop-pins $n$ $n$, where they remain until the vehicle has passed entirely through and the wheels have passed off the far end of the timbers H H, when the gravity of the gates, having no longer the resistance of the gravity of the vehicle, causes them to resume their normal position, as seen in Fig. 1.

By reason of the gates being hung to the swinging bars F F at a point within their centers of gravity, they press toward each other when closed with a positive force, and thus are prevented from all casual swinging by means of wind or other accidental causes, which obviates the necessity of providing complicated and troublesome catches and fastenings, by which the expense and non-effectiveness of gates of this kind are much augmented.

It will be seen that this gate is extremely simple and not liable to get out of order, and can be erected at a very moderate expense, and kept in order and repaired by ordinary farmhands, which is a very important matter in a practical point of view.

Having thus described our invention, what we claim as new, and desire to secure by Letters Patent, is—

1. The method of hanging the gates to the bars F F by which they are kept in contact by positive force while closed without the use of latches or catches of any kind, substantially as shown and described.

2. The combination of the timbers H H, levers I I, links J J, rods $l\ l$, bell-cranks K K, and links $m\ m$, all arranged and operating substantially as shown and described.

J. S. ELKINS.
J. T. GREEN.

Witnesses:
L. R. DAVIS,
FRANK DAVIS.